(12) United States Patent
Bellessort et al.

(10) Patent No.: US 11,924,404 B2
(45) Date of Patent: Mar. 5, 2024

(54) METHOD, DEVICE, AND NON-TRANSITORY COMPUTER-READABLE MEDIUM FOR SETTING PARAMETERS VALUES OF A VIDEO SOURCE DEVICE

(71) Applicant: MILESTONE SYSTEMS A/S, Brøndby (DK)

(72) Inventors: Romain Bellessort, Rennes (FR); Tristan Halna Du Fretay, Langan (FR)

(73) Assignee: MILESTONE SYSTEMS A/S, Brøndby (DK)

( * ) Notice: Subject to any disclaimer, the term of this patent is extended or adjusted under 35 U.S.C. 154(b) by 87 days.

(21) Appl. No.: 17/606,734

(22) PCT Filed: Sep. 17, 2020

(86) PCT No.: PCT/EP2020/075974
§ 371 (c)(1),
(2) Date: Oct. 26, 2021

(87) PCT Pub. No.: WO2021/053070
PCT Pub. Date: Mar. 25, 2021

(65) Prior Publication Data
US 2022/0224880 A1  Jul. 14, 2022

(30) Foreign Application Priority Data
Sep. 18, 2019 (GB) ..................... 1913462

(51) Int. Cl.
*H04N 23/66* (2023.01)
*G06T 7/80* (2017.01)
(Continued)

(52) U.S. Cl.
CPC ............. *H04N 17/002* (2013.01); *G06T 7/80* (2017.01); *H04N 7/181* (2013.01);
(Continued)

(58) Field of Classification Search
CPC .......... H04N 23/66–662; H04N 23/90; G08B 13/19645; G08B 13/19654; G08B 13/19656
(Continued)

(56) References Cited

U.S. PATENT DOCUMENTS 10,855,728 B2 * 12/2020 Meganathan ....... H04L 65/1069
2014/0267814 A1 * 9/2014 Matsuo ................ H04N 23/661
348/211.11
(Continued)

FOREIGN PATENT DOCUMENTS

GB   2552511 A   1/2018
GB   2570448 A   7/2019

*Primary Examiner* — Anthony J Daniels
(74) *Attorney, Agent, or Firm* — Canon U.S.A., Inc. IP Division

(57) ABSTRACT

A method for setting a parameter value of a first video source device comprises:

determining a first set of image characteristic values from an image captured by the first video source device configured with a first set of parameter values;

obtaining a second set of image characteristic values generated from an image captured by a second video source device different from the first video source device, the second video source device being configured with a second set of parameter values;

determining if the obtained second set of image characteristic values comprises values equivalent to values of the determined first set of image characteristic values; and if there are equivalent values, setting the parameter value of the first video source device using the second set of image characteristic values.

13 Claims, 7 Drawing Sheets

(51) Int. Cl.
*H04N 7/18* (2006.01)
*H04N 17/00* (2006.01)
*H04N 23/617* (2023.01)
*H04N 23/72* (2023.01)

(52) U.S. Cl.
CPC .......... *H04N 23/617* (2023.01); *H04N 23/66* (2023.01); *H04N 23/72* (2023.01)

(58) Field of Classification Search
USPC .................................................. 348/211.99
See application file for complete search history.

(56) References Cited

U.S. PATENT DOCUMENTS

| | | | |
|---|---|---|---|
| 2018/0270427 A1* | 9/2018 | Damstra | H04N 21/21805 |
| 2018/0316905 A1 | 11/2018 | Nobori et al. | |
| 2020/0077033 A1* | 3/2020 | Chan | H04N 23/951 |
| 2020/0314323 A1* | 10/2020 | van Geel | H04N 23/90 |
| 2021/0012149 A1* | 1/2021 | Yamamoto | H04N 23/80 |

* cited by examiner

| Camera Type | Measurements ID | Gain | Shutter | Noise | Contrast |
|---|---|---|---|---|---|
| VB-H45 | ABC | 0 | 2000 | 4.5 | 0.6 |
| VB-H45 | ABC | 12 | 2000 | 5.8 | 1.0 |
| VB-H45 | ABC | 24 | 2000 | 7.9 | 0.7 |
| VB-H45 | ABC | 36 | 2000 | 10.2 | 0.2 |
| VB-H45 | XYZ | 0 | 2000 | 4.6 | 1.1 |
| VB-H45 | XYZ | 12 | 2000 | 5.7 | 0.6 |
| VB-H45 | XYZ | 24 | 2000 | 7.9 | 0.2 |
| VB-H45 | XYZ | 36 | 2000 | 10.3 | 0.0 |
| ... | ... | ... | ... | ... | ... |

Fig. 5

METHOD, DEVICE, AND NON-TRANSITORY COMPUTER-READABLE MEDIUM FOR SETTING PARAMETERS VALUES OF A VIDEO SOURCE DEVICE

CROSS-REFERENCE TO RELATED APPLICATIONS

This application is the National Phase application of PCT Application No. PCT/EP2020/075974, filed on Sep. 17, 2020 and titled "METHOD, DEVICE, AND COMPUTER PROGRAM FOR SETTING PARAMETERS VALUES OF A VIDEO SOURCE DEVICE". This application claims the benefit under 35 U.S.C. § 119(a)-(d) of United Kingdom Patent Application No. 1913462.6, filed on Sep. 18, 2019. The above cited patent applications are incorporated herein by reference in their entirety.

FIELD OF THE INVENTION

The present invention relates to a method, device and non-transitory computer-readable medium for setting parameters values of a video source device.

BACKGROUND OF THE INVENTION

Video-surveillance is based on cameras that are expected to record live footage with an image quality that is sufficient to fulfill its mission (e.g., being able to recognize a human person, or being able to read a license plate are common requirements), without leading to excessive resource consumption (specifically bandwidth and recording resource).

Independently from the camera model, quality and resource consumption depend a lot on the camera settings, with huge differences between a camera with optimal settings vs. a camera with default settings or, worse, with inadequate settings.

In order to modify the camera settings, the following methods are used but with some drawbacks:

Manual settings. Fixing the settings by the installer is a common procedure. However, it is costly since it requires a long installation time with a trained staff, several hours are sometimes necessary for a good setting in some cases. It is also not dynamic, which means that the fixed setting may fail when conditions change (e.g., summer/winter). This is also sometimes difficult since the camera menus are completely different from one camera to the other, which limits the number of cameras staff is trained on.

Embedded auto-settings. There are usually auto-exposure methods in the modern cameras. However, they may encounter some motion blur or some targets contrast issues, which is the reason why they actually work only in the most common cases (good lighting, slow-moving targets). Some new, high-end cameras are equipped with target-detection hardware that makes it possible to have some more accurate auto-setting, as they are able to see the important parts of an image (the targets). However, this requires expensive additional embedded sensors and hardware that make it not an economic and realistic solution in most cases.

Auto-setting based on calibration (measurements are made for various combinations of parameter values). Usually, calibration requires a high number of measurements, which is time-consuming. In fact, the more measurements are made, the more accurate the model is and better is the result during operation. However, during the calibration, the camera cannot be used to fulfill its mission as there are situations where image quality often changes and can sometimes be very poor. Consequently, from a user's point of view, a long calibration may generate drawbacks.

SUMMARY OF THE INVENTION

Consequently, the known methods have such drawbacks that it is of interest to propose a method with reduced costs, i.e., reducing the number of measurements that have to be done to perform the calibration, hence reducing calibration time.

The present invention has been devised to address one or more of the foregoing concerns.

In a first example embodiment, a method for setting a parameter value of a first video source device comprises:
  determining a first set of image characteristic values from an image captured by the first video source device configured with a first set of parameter values;
  obtaining a second set of image characteristic values generated from an image captured by a second video source device different from the first video source device, the second video source device being configured with a second set of parameter values;
  determining if the obtained second set of image characteristic values comprises values equivalent to values of the determined first set of image characteristic values; and if there are equivalent values, setting the parameter value of the first video source device using the second set of image characteristic values.

Accordingly, the method advantageously uses an automatic method based on image characteristics to optimise a parameter value of the camera.

This embodiment may comprise other features, alone or in combination, which are disclosed in the dependent claims.

Among the advantages of these features, there is a substantial reduction of the calibration time.

According to a second aspect of the invention, there is provided a computer program product for a programmable apparatus, the computer program product comprises a sequence of instructions for implementing each of the steps of the method here above when loaded into and executed by the programmable apparatus.

According to a third aspect of the invention, there is provided a non-transitory computer-readable storage medium storing instructions of a computer program for implementing each of the steps of the method described above.

According to a fourth aspect of the invention, there is provided a device for setting the parameters values of a video source, the device comprising a processing unit configured for carrying out some or all of the steps of the method described above.

At least parts of the methods according to the invention may be computer implemented. Accordingly, the present invention may take the form of an entire hardware embodiment, an entire software embodiment (including firmware, resident software, microcode) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer-readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g., a microwave or RF signal.

BRIEF DESCRIPTION OF THE DRAWINGS

Embodiments of the invention will now be described, by way of example only, and with reference to the following drawings in which:

FIG. 5 illustrates an example of calibration data;

DETAILED DESCRIPTION OF THE INVENTION

Generally, a video surveillance system comprises several cameras. In some cases, hundreds or even thousands of cameras are connected to a single system such as Milestone XProtect (trademark of Milestone Systems Inc.). Therefore, it is very common that several instances of the same type of camera are used in a given system.

In such situations, each time a calibration step is to be performed, it should be determined whether previous calibration data from other cameras may be reused instead of doing the whole calibration process. This determination should be based on some information obtained about considered camera (typically the type of camera and a few image measurements). If so, at least part of the calibration process can be skipped. If not, the full-calibration process is run.

Globally, this solution allows reducing the number of measurements that have to be done to perform the calibration, hence reducing calibration time. It also reduces the footprint of doing a calibration, which can be a significant cost for broad systems with many cameras.

In the following, a new auto setting method is disclosed that solves the prior art issues when coming to camera auto-setting.

Figure 1:
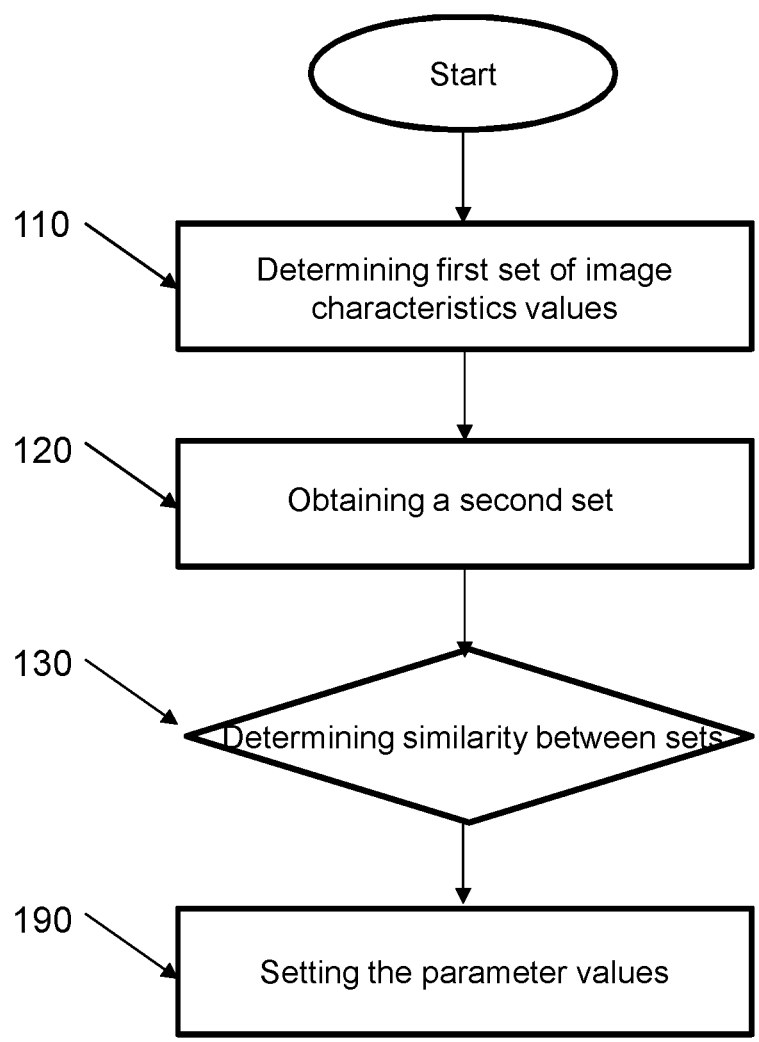
FIG. 1 illustrates a general embodiment of a method for setting parameters values of a video source device.

In reference to FIG. 1, a method for setting parameters values of a first video source device comprises:

Determining, step 110, a first set of image characteristic values from an image captured by the first video source device configured with a first set of parameter values;

Obtaining, step 120, a second set of image characteristic values generated from an image captured by a second video source device different from the first video source device, the second video source device being configured with a second set of parameter values;

Determining, step 130, if the obtained second set of image characteristic values comprises values equivalent to values of the determined first set of image characteristic values; and, if there are equivalent values, setting, step 190, the parameter value of the first video source device using the second set of image characteristic values.

A detailed description of an embodiment of the method is disclosed here after, in which the video source device is defined as a video camera or a camera capable of video capture.

Different kinds of auto setting algorithms may be considered, but an auto-setting algorithm introduces a model that allows predicting image quality based on a number of camera parameters. Such model can generally be split in different sub-models, each sub-model allowing addressing a specific part of the global technical problem (i.e., predicting image quality based on a number of camera parameters). Typically, different sub-models may be considered for different image characteristics impacting image quality, such as noise, contrast, motion blur or encoding artefacts. For the clarity of the specification, a model that allows predicting image quality based on camera parameters is considered, but this does not mean that model may not include further inputs. For instance, available bandwidth, which clearly has an impact on image quality, may also be part of the model.

Sub-models can be split in two parts: scene-dependent sub-models and scene-agnostic sub-models. Scene-agnostic sub-models can be reused for two cameras of the same type given that they depend only on camera type, whereas scene-dependent sub-models cannot as they depend on the recorded scene.

As an example, noise is mostly dependent on gain: therefore, noise can be modeled as a function of gain, and this function only depends on the type of camera: this function is therefore scene-agnostic.

On the other hand, contrast depends on the captured scene (e.g., for similar ambient light, the value of contrast depends on the scene because of its colours, objects, shadows, etc.). Therefore, contrast=f(exposure) is scene-dependent.

Even though the calibration data allowing creating scene-dependent sub-models are generally not reused between two cameras of the same type, it may still be possible to take advantage of such data to reduce calibration time as explained below. For instance, when a considered auto setting algorithm works by continuously refining its model/sub-models, using some data that is not exactly the same as the one that would be obtained by doing a full-calibration process may still provide good results. In order to select sufficiently close data, it may be possible to do just a few measurements (e.g., 2) and based on them, determine the closest corresponding calibration data that is stored. Then, this data can be used as a first approximation to build a model/sub-model that will then progressively be refined.

Calibration data consists of a set of measurements, each measurement typically associating a set of settings values to one or more calculated image characteristics such as noise, contrast or motion blur.

Based on those measurements, auto setting model/sub-models can be created. Therefore, when such calibration data is stored and reused, it may have two meanings:

Meaning #1: the calibration data (i.e., set of measurements) may be reused as is by an auto setting algorithm; in this case, the algorithm will create its model/sub-models based on those measurements;

Meaning #2: the calibration data may be used to create a model/sub-model (e.g., noise=f(gain)), this model/sub-model being directly provided to the auto setting algorithm (i.e., the auto-setting algorithm is not responsible for creating the model/sub-models based on some measurements, contrary to #1). In this case, such models/sub-models may be stored and may be made available to the auto-setting implementation through a specific API that gets such models/sub-models based on a camera type.

The second option is more complex to set up, but it avoids redoing the process of creating similar models/sub-models based on the same measurements for each camera of the same type. The second option is therefore more efficient. Another advantage of the second option is that it allows creating a shared model/sub-model based on calibration data possibly gathered from multiple cameras of the same type. Relying on several cameras likely allows obtaining data covering a broader range of situations, hence enabling the generation of more accurate models/sub-models.

The camera type is advantageously defined so that cameras with the same type have the same scene-agnostic sub-models (hence may use the same calibration data for generating these sub-models). Therefore, considering only the camera "name" may not be sufficient as the camera firmware, for instance, may also impact the camera behaviour.

As an example, a given firmware version may implement a noise reduction algorithm different from another firmware version. Hence, it may happen that two cameras with the same "name" have different noise sub-models due to different firmware.

Consequently, in some embodiments, it may make sense to define the camera type as the camera name+the firmware version number (which is generally the equivalent of a name for firmware).

An additional refinement may consist in having the system to determine on its own whether an unknown firmware version number (e.g., 3.1.4) gives the same result as a known version number (e.g., 2.9.1). This can be trivially done by comparing the scene-agnostic sub-models obtained for those two versions. If they are similar, the two versions may be considered as a single camera type. This can for instance be achieved by storing the equivalence between those version numbers, and by implementing a specific function for filtering calibration data based on camera type that returns measurements made with the same camera type or an equivalent one. This approach may also be applied to cameras having different names, in order to identify equivalent cameras even from different vendors.

It should actually be noted that even cameras from different vendors may be considered equivalent as different vendors may rely on the same hardware/software.

A detailed embodiment which includes optional steps is now disclosed. The main steps of the embodiment of FIG. 1 will be detailed in relation with FIG. 4.

Figure 2:
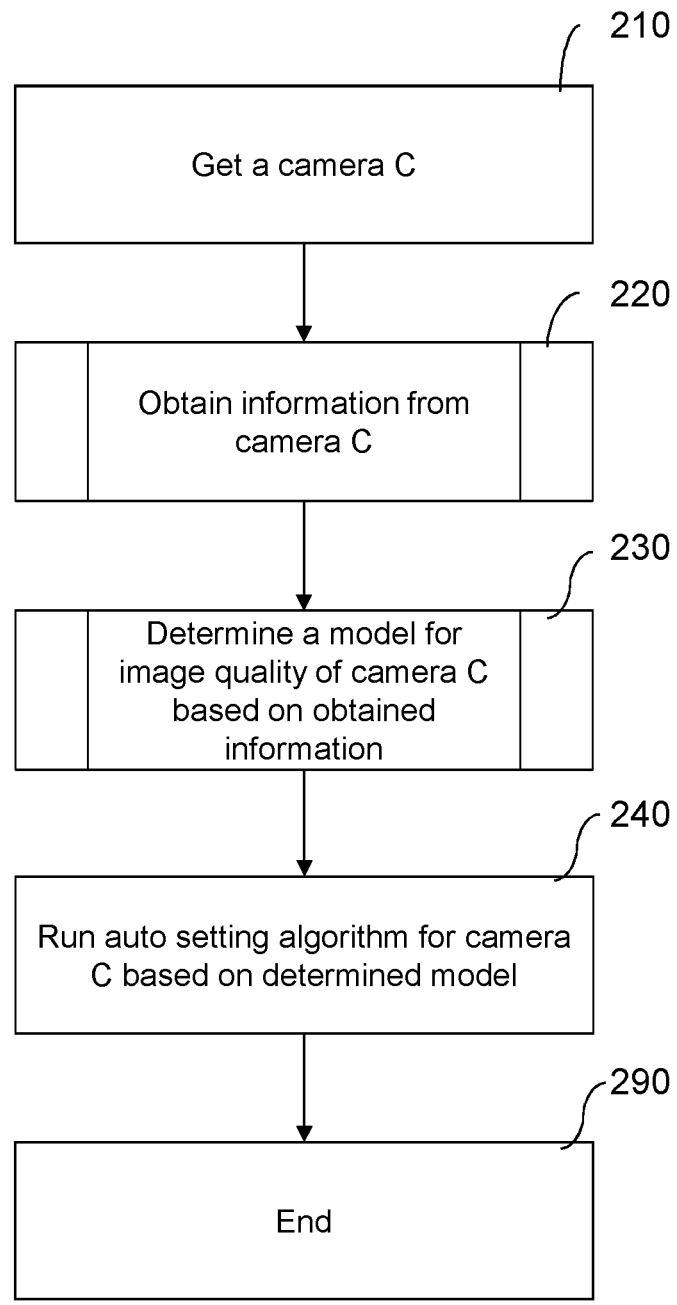
FIG. 2 illustrates the main steps of a detailed embodiment of the method.

In reference to FIG. 2, an overview of the embodiment comprises, at step 210, the identification of a camera C. This camera is for instance characterised by its IP address, so that it may be possible to connect to it, typically using a specific login and password.

Second, at step 220, information is obtained from camera C. This step is further described with regard to FIG. 3.

Third, at step 230, a model adapted to predict the quality of images recorded by camera C depending on the values of its parameters is determined based on step 220 information. This step is further described with regard to FIG. 4.

Fourth, at step 240, an auto-setting algorithm is executed based on the determined model in order to automatically handle the selection of parameter values for camera C. This step is typically executed on a server responsible for executing an auto setting algorithm for one or more cameras.

Finally, the process ends at step 290.

Figure 3:
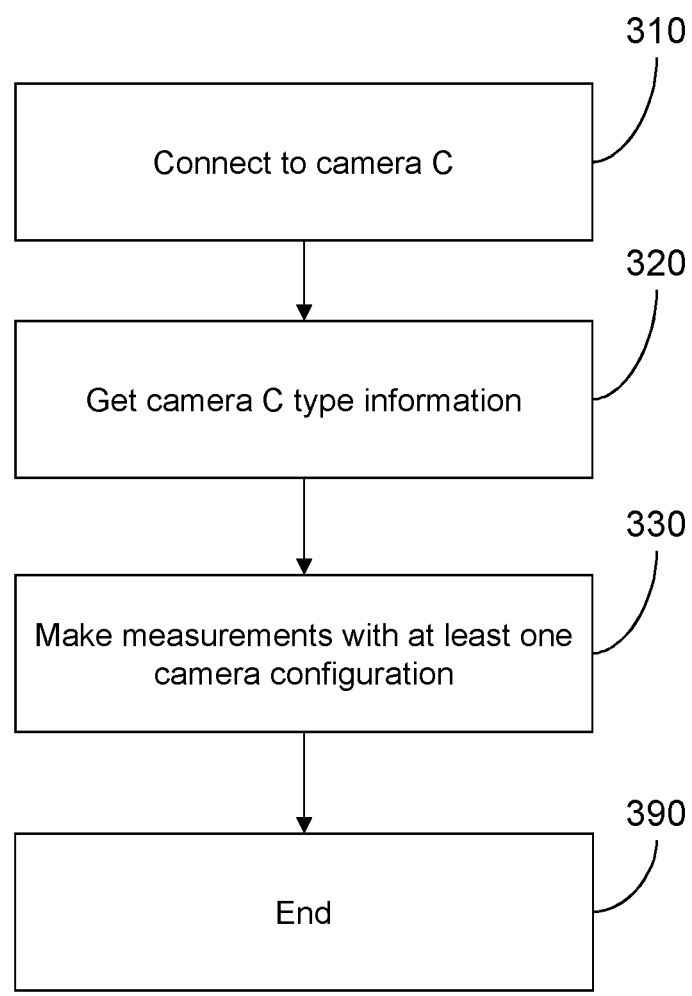
FIG. 3 illustrates the step for obtaining information for the embodiment of FIG. 2.

In reference to FIG. 3, the information from camera C may be obtained with the following steps.

At step 310, a connection is established with camera C. This may typically be achieved through an HTTP connection, by using a login and password that have been configured for this camera by the system administrator.

Then, at step 320, the type of camera C may be determined. The information needed to determine the type of the camera may be made available by camera vendors through the sending of an HTTP request to a given URL. For instance, if camera C has an IP address 192.168.1.1, it may be possible to get the type of camera C by sending a request to http://192.168.1.1/info. The specific URL to be requested, of course, depends on the camera and can be known from the camera documentation. Alternatively, in the case of a video surveillance system such as Milestone XProtect, the types of cameras may be stored in a database (e.g., because the type of each camera has been determined and saved when the camera has been added to the system). In this case, there is no need to send a request in order to determine the type of the camera. Instead, the type of the camera can be obtained from the database.

In a particular embodiment, the step 320 may be omitted. In that case, all image characteristics are analysed as if they were scene-dependent.

At step 330, some measurements are made with at least one camera configuration. A camera configuration is a set of values for the different parameters of camera C. For instance, current values are determined, and one or more images are obtained in order to calculate the current contrast, noise and motion blur. The measurements may be expressed as (x, y) points or pairs, where x represents a set of parameter value(s), and y the value of a given image characteristic. 'x' can represent the value of one parameter, or values of different parameters. Those measurement parameters will be used to determine whether there exist similar scene-dependent calibration data. Therefore, doing measurements for more than a single camera configuration may be useful. For instance, 2 or 3 camera configurations may be used. As an example, different camera configurations can be obtained by changing the gain value and/or the shutter value. Preferably, the change of parameters should have a significant impact on image characteristics. Indeed, this is more likely to provide accurate evaluation of the similarity between corresponding measurements and stored calibration data.

Finally, at step 390, the process ends.

Figure 4:
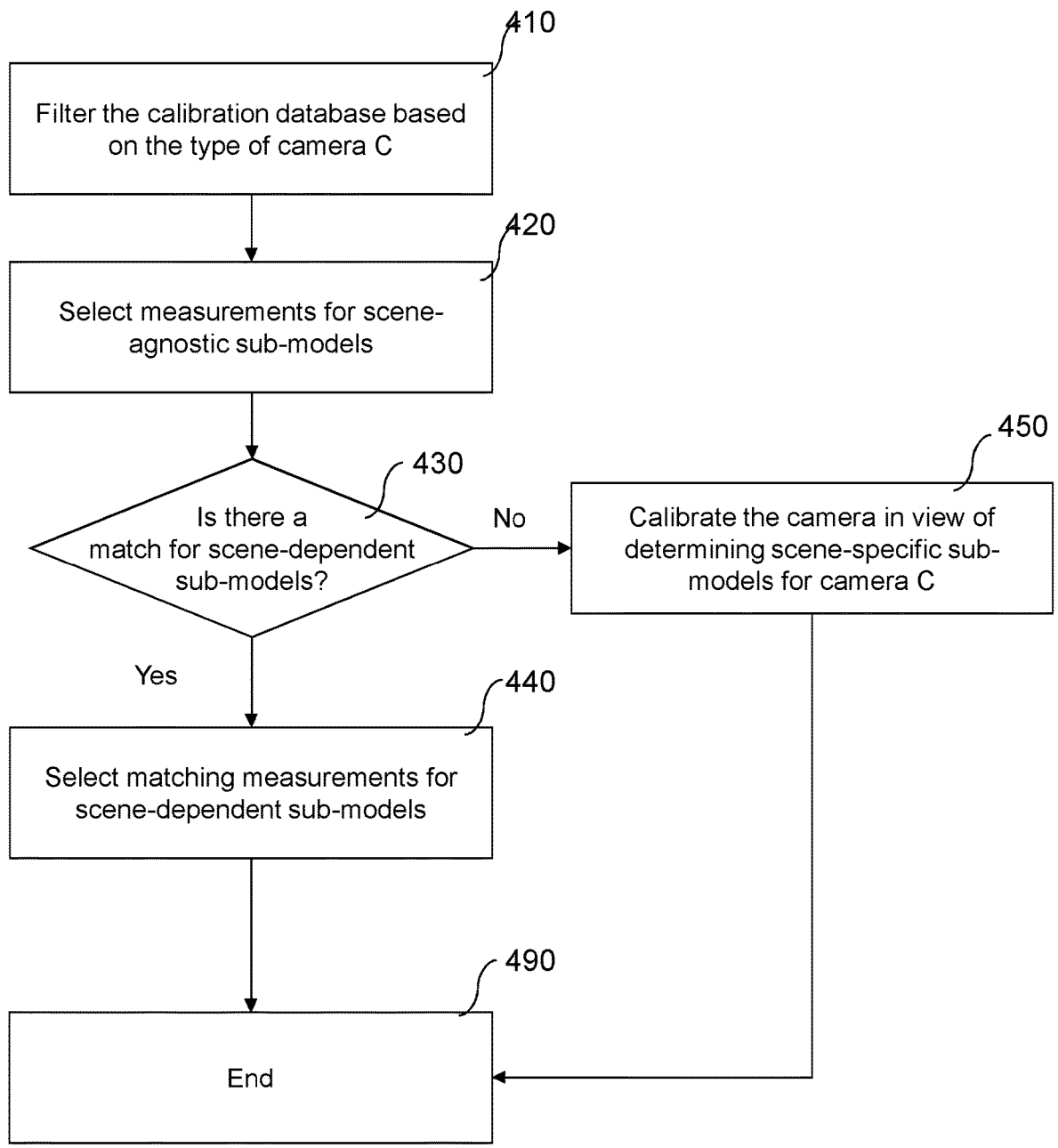
FIG. 4 illustrates the step of determination of a model for the embodiment of FIG. 2.

FIG. 4 shows the steps for determining a model based on the obtained information (step 230 of FIG. 2).

At step 410, the stored calibration data (e.g., stored in a calibration database) is filtered based on the type of camera C, i.e., only calibration data associated with the same type of camera is selected.

At step 420, the measurements used for the scene-agnostic sub-models are selected from data resulting from the filtering of step 410. Based on those measurements, each sub-model can be created. For instance, the noise measurements (along with associated gain values) are selected in order to create a model f of noise such that noise=f(gain). As another example, the motion blur measurements (along with shutter values) are selected in order to create a model g of motion blur such that motion_blur=g(shutter).

At step 430, it is checked whether there is a match for each scene-dependent sub-model. This is done by comparing the measurements made at step 330 to the filtered measurements resulting from the filtering step 410. Preferably, the measurements are compared for identical parameters values; alternatively, if several measurements are available, comparing the measurements may be achieved by comparing the delta of parameter values between two image characteristic values. The goal of this comparison is to determine whether the measurements of step 330 correspond to an existing set of measurements from the database. There are different ways of doing that. Further indications are provided below.

If such a match is found, the corresponding measurements are selected at step 440 for the scene-dependent sub-models. As an example, the contrast measurements (along with associated gain and shutter values, or exposure values if they are available) are selected in order to create a model h1 of contrast such that contrast=h1 (gain, shutter) or another model h2 of contrast such that contrast=h2(exposure).

On the other hand, if no such match is found at step 430, additional points are measured at step 450 in view of determining corresponding scene-dependent sub-models for camera C.

The process ends after steps 440 or 450 at step 490.

The comparison of step 430 between measurements and stored calibration data may use the following embodiment.

The measurements that are compared can be expressed as (x, y) "points" (or "pairs of elements") in a space, where x represents a set of parameter value(s), and y the value of a given image characteristic.

Let us consider two points (x, y) and (a, b), the first point being a measurement obtained at step 330, and the second point corresponding to a point stored in the calibration database. Assuming that both points correspond to the same parameters values (i.e., x and a are equal), these points can be compared by calculating the absolute value of (b−y) (b and y are for instance contrast values). On the other hand, assuming that there is no point (a, b) such that a is equal to x, it is possible to rely on the corresponding sub-model f inferred from the considered measurements to obtain b=f(a) and then calculating b'=f(x), for instance by linear interpolation/extrapolation, to come back to the first case of (x, y) and (a, b) points with x and a being equal (i.e., a point (a, b) has been created where a is equal to x and b to b').

If several points have been measured at step 330, the closest set of measurements from the database can be determined as the set for which the sum of such absolute values is minimal. As another example of criterion, the median of absolute values may be used to determine the closest set of measurements from the database. Calculating distances is a well-known topic with various well-known solutions.

Once the closest set of measurements has been determined, two different cases may be considered First, a threshold may be used to determine whether step 330 measurements and closest match are sufficiently close; the threshold typically depends on the range of possible values for the considered image characteristic; for instance, if noise typically stands in the range [0, 25], a threshold of 1 could be used; on the other hand, if the measurement of contrast typically stands in the range [0, 1.25], a threshold of 0.05 could be used. These thresholds are just provided as sample thresholds values, and an implementer could select other values.

Second, it may be decided to use the closest match even in the absence of a threshold; this may be especially relevant if the auto-setting algorithm continuously refines its model based on latest measurement.

Alternatively, if multiple measurements are available, it may be possible to compare the evolution of parameter values between two given image characteristic values. In this case, the distance applies to the evolution of parameter values. In the following, the term "parameter shift" refers to the evolution of parameter values. For instance, let us consider the image luminance, here defined as the sum of the values for each channel of an RGB image, typically ranging between 0 and 765 given that each channel ranges between 0 and 255. For a first camera, the luminance may be equal to 200 with parameters (gain=10, shutter=1000), and equal to 500 with (gain=10, shutter=20000), i.e., at constant gain, shutter has to be multiplied by 20 to move from 200 to 500. When checking measurements stored for another camera, we may find out a similar factor, even though the actual parameter values associated to luminance 200 and 500 may be different (e.g., they may respectively be (gain=0, shutter=500) and (gain=0, shutter=10000)). This may occur if the amount of ambient light differs (e.g., because of different weather conditions). Depending on the considered parameter, different kinds of evolution may be checked. Given that gain has a linear impact, the evolution of gain is typically calculated as the difference between two gains. On the other hand, given that shutter is exponential, the evolution of shutter is typically calculated as a ratio or factor; as a remark, shutter evolution may be calculated as a difference if the logarithm of shutter values is considered.

As described above, if the "y" value measured for the first video source device is not present in the filtered measurements list, the corresponding "x" value may be determined through linear interpolation/extrapolation.

When comparing evolution of parameter values, a threshold is preferably defined to determine whether two evolutions are equivalent or not. For instance, a relative threshold may be used to consider values that are at most 10% different as similar.

In case of doubt at step 430 regarding the existence of a close match, it may be possible to request one or more additional measurements. This doubt may be assessed by considering the variance between compared measurements, as further described in the next paragraph. This is somehow a trade-off between steps 440 and 450. For instance, it may be relevant to request e.g., one or two additional measurements if one of the already made measurements appears to be an invalid measurement (e.g., the distance is significantly greater than the median of distances for other points).

By doing these additional measurements, the confidence in whether the possible match is a good match or not is increased. It requires more time than if no additional measurement is made (step 440), but less time than if all measurements are made (step 450). The confidence may be assessed by using the variance or the standard deviation of the distance between two measurements/points. In an embodiment, one may compare the variance of the distance between two points with a predetermined threshold. To illustrate our purpose, let us consider the following example: on the one hand, if the distance between two points p1 and p2 equals 0.1 and the distance between two points p1 and p3 equals 10, then the variance of the distance (e.g., which equals 24.5025) is superior to a predetermined threshold (e.g., 1), and one may consider another point. On the other hand, if the distance between two points p1 and p2 equals 0.1 and the distance between two points p1 and p3 equals 0.2, then the variance of the distance (e.g., which equals 0.0025) is inferior to a predetermined threshold (e.g., 1), and the measurements may be considered as being reliable. Optionally, two thresholds may be defined (e.g., 1 and 5): if the variance is lower than the lower threshold, the match is considered to be a close match and no additional measurement is made. If the variance is greater than the greater threshold, it is considered that there is no match and no additional measurement is made either. If the variance ranges between the two thresholds, an additional measurement is made. This process can be iterated, and for each iteration the range between the two thresholds is reduced. For instance, the lower threshold may keep the same value, while the greater threshold value may be decreased by 25% until reaching the lower threshold.

The points to be measured at step 330 (or at 430 in the case of the above remark) may be selected based on the points already present in the database of calibration data. Typically, a list of set of parameter(s) values (e.g. (gain=0, shutter=2000), (gain=0, shutter=4000)) may be obtained based on the database and the considered type of camera. Then, a subset of those points may be selected as a preliminary step to step 330. Points may be selected by considering the expected measured values, e.g., if a measurement of 0.5 for contrast already exists, a set of parameters values that is expected to give a significantly greater contrast (e.g. >=0.9) is selected. Indeed, in this case, it is likely to get a meaningful confirmation that the set of measurements is a close match. Particularly, the selection of points may be iterative. After the measurement of a first point, and the comparison of stored measurements with the new measurement point, a second point may be selected.

FIG. 5 illustrates an example of stored measurements. This sample table is simplified compared to a realistic table: it comprises only 2 sets of measurements (Measurements ID column), fora single type of camera (Camera Type column), with only 2 parameters (Gain and Shutter columns) and 2 image characteristics (Noise and Contrast columns). Typically, further measurements may be made for each set in a full calibration (i.e., more different combinations of parameter(s) values).

Let us consider the measurement of one point for a VB-H45 camera with the following parameters values (gain=12, shutter=2000) and following image characteristics (noise=5.6, contrast=0.9). The method according to the invention determines whether there is a match or not.

The check may only be done for the contrast criterion given that noise is not a scene-dependent sub-model. Therefore, contrast measurements are compared: for measurements ID ABC, there is an absolute difference of 0.1;

for measurements ID XYZ, there is an absolute difference of 0.3.

Therefore, the closest match is the set of measurements ABC. Of course, the fact that measurements ABC accurately correspond to the newly considered camera would be more reliable if at least an additional point is measured. For instance, the point with parameters (gain=36, shutter=2000) could be measured given that it is present in the database for both measurements ABC and XYZ.

If the resulting contrast value were e.g., 0.1 or 0.3, the measurements would be very close to the measurements ABC (whose contrast is 0.2), hence measurements ABC could be used to generate the corresponding sub-model. Preferably, the points from measurements ABC with the same parameters values as the 2 measurements made for the newly considered camera should be replaced by their newly measured equivalent points.

Oppositely, if the measured contrast for the second point were 0.6, there would have a significant difference with measurements ABC, and also with measurements XYZ. In this case, it seems that no existing measurement data would match the newly measured points. Therefore, it appears that the whole calibration process should be done.

In a given implementation, the number of points to be measured may be fixed in advance based on tests showing that it allows obtaining a good trade-off.

Optionally, a maximum number of points to be measured may be defined along with a total difference threshold. In this case, the total difference may be defined as the sum of the absolute differences for each point (e.g., in the case where the absolute difference is 0.1 for the first point and 0.2 for the second point, the total difference is 0.3). Then, as soon as the total difference exceeds the total difference threshold for all possible sets of measurement, no additional point is measured. Indeed, as soon as the threshold is exceeded, it means, by definition, that there is no satisfying match.

Figure 6:
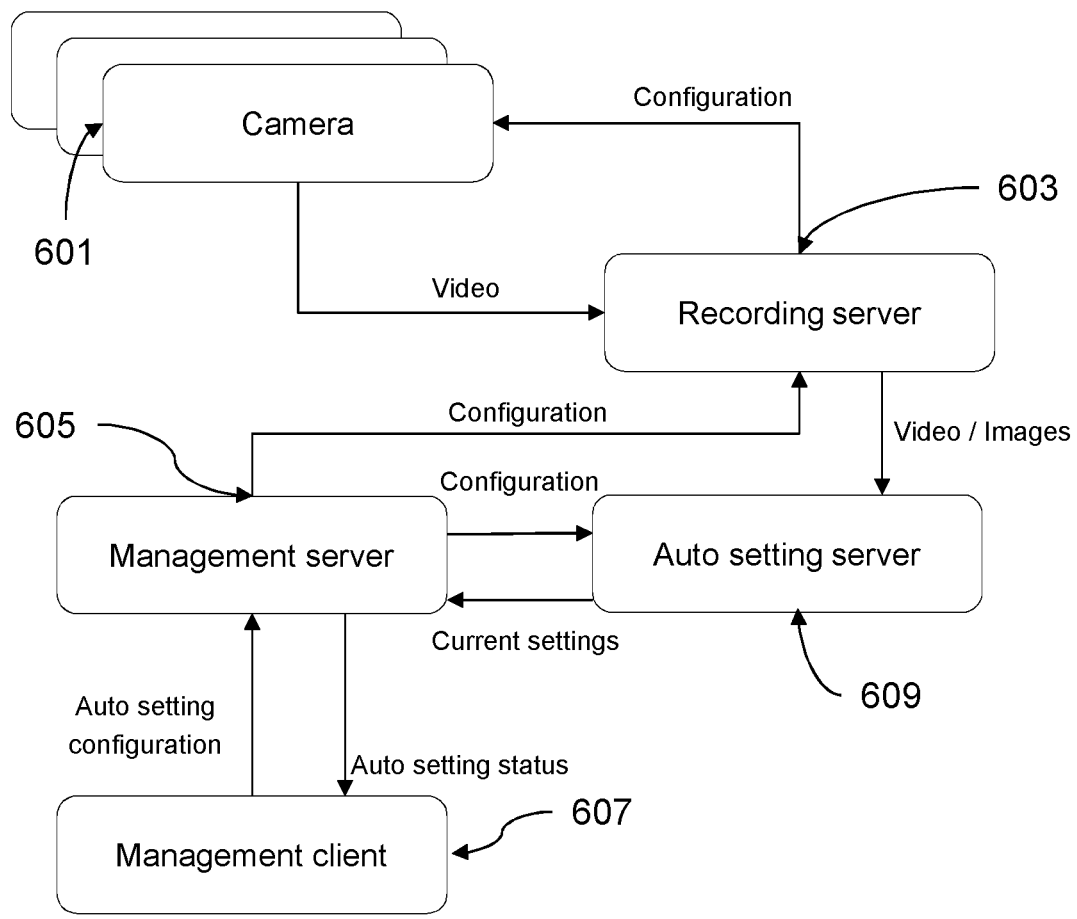
FIG. 6 illustrates a sample architecture for a system implementing the disclosed embodiment.

FIG. 6 shows a sample architecture for a system (such as a video surveillance system like Milestone XProtect) implementing the disclosed embodiment.

This architecture comprises the following components:
Camera 601 that record video data;
A recording server 603 that is connected to cameras and has an API to configure them; this server obtains video data from the cameras, records them and makes them available to other system components;
A management server 605 that stores the system configuration and interacts with other components of the system to configure them (especially the recording server and the auto-setting server);
A management client 607 that allows changing the configuration on the management server; as an example, this client may allow indicating that a given camera should be controlled by the auto setting algorithm; this client may also enable viewing status information regarding auto setting execution;
An auto-setting server 609, responsible for executing the auto setting algorithm for a number of cameras; auto setting server is configured by the management server, which is itself controlled by a system administrator/user through the management client depending on their user rights.

This architecture is an example of architecture. Each component may be implemented as different components. For instance, the auto-setting server could be implemented as two servers, either for a design reason (e.g., two different kinds of tasks are identified in the auto-setting algorithm; hence two servers are implemented, each one being responsible for a given task), or for a performance reason (e.g., to support a greater number of cameras).

In this example of architecture, the calibration data may for instance be stored in a database associated to the auto-setting server. In another implementation, if a database is already associated with the management server in order to store all configuration information, it may be more convenient to store calibration data in this database.

Figure 7:
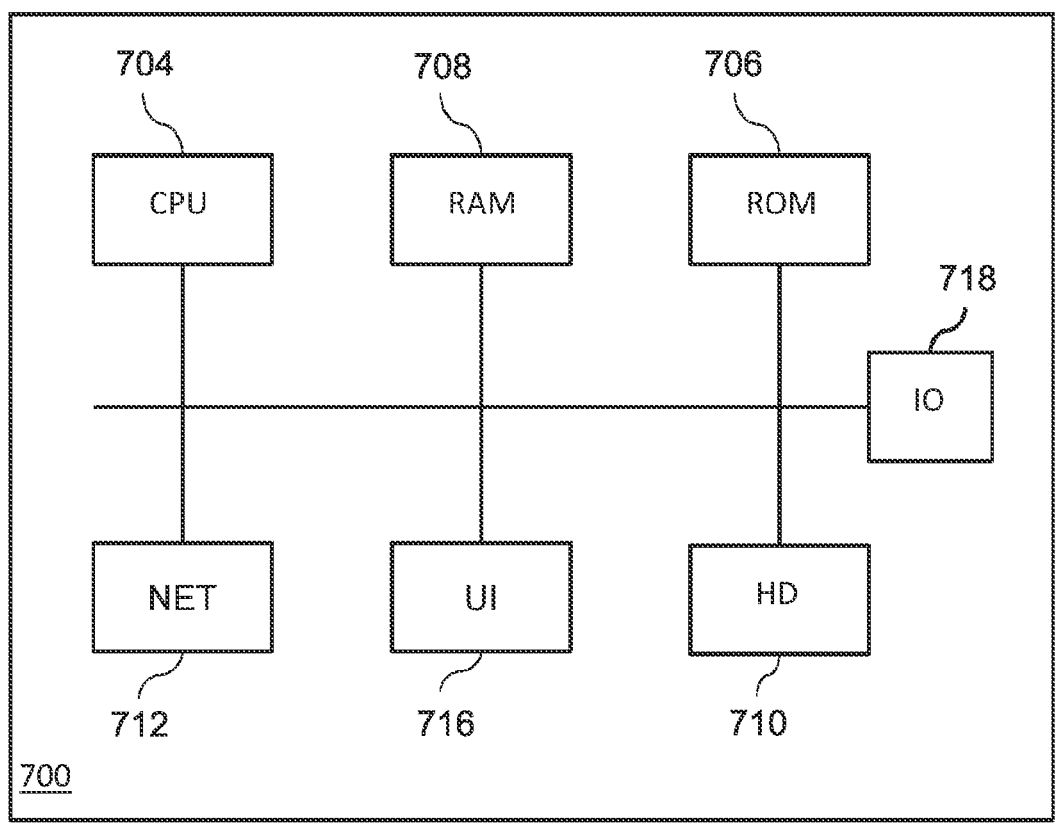
FIG. 7 illustrates a schematic block diagram of a computing device for implementation of the embodiments.

FIG. 7 is a schematic block diagram of a computing device 700 for the implementation of one or more embodiments of the invention. The computing device 700 may be a device such as a microcomputer, a workstation or a light portable device. The computing device 700 comprises a communication bus 702 connected to:

a central processing unit (CPU) 704, such as a microprocessor;

a random access memory (RAM) 708 for storing the executable code of the method of embodiments of the invention as well as the registers adapted to record variables and parameters necessary for implementing the method for encoding pictures, the memory capacity thereof can be expanded by an optional RAM connected to an expansion port, for example;

a read-only memory (ROM) 706 for storing computer programs for implementing embodiments of the invention;

a network interface 712 that is, in turn, typically connected to a communication network 714 over which digital data to be processed are transmitted or received. The network interface 712 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 704;

a user interface (UI) 716 for receiving inputs from a user or to display information to a user;

a hard disk (HD) 710;

an I/O module 718 for receiving/sending data from/to external devices such as a video source or display.

The executable code may be stored in read only memory 706, on the hard disk 710 or on a removable digital medium for example such as a disk. According to a variant, the executable code of the programs can be received by means of a communication network, via the network interface 712, in order to be stored in one of the storage means of the communication device 700, such as the hard disk 710, before being executed.

The central processing unit 704 is adapted to control and direct the execution of the instructions or portions of software code of the program or programs according to embodiments of the invention, which instructions are stored in one of the aforementioned storage means. After powering on, the CPU 704 is capable of executing instructions from main RAM 708 relating to a software application after those instructions have been loaded from the program ROM 706 or the hard disk (HD) 710, for example. Such a software application, when executed by the CPU 704, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described herein above with reference to specific embodiments, the present invention is not limited to the specific embodiments, and modifications will be apparent to a person skilled in the art which lies within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged or combined, where appropriate.

In the claims, the word "comprising" does not exclude other elements or steps, and the indefinite article "a" or "and" does not exclude a plurality. The mere fact that different features are recited in mutually different dependent claims does not indicate that a combination of these features cannot be advantageously used.

The invention claimed is:

1. A method of setting a parameter value of a first video source device, the method comprising:

determining a first set of image characteristic values from an image captured by the first video source device configured with a first set of parameter values;

obtaining a second set of image characteristic values generated from an image captured by a second video source device different from the first video source device, the second video source device being configured with a second set of parameter values;

determining if the obtained second set of image characteristic values comprises values equivalent to values of the determined first set of image characteristic values;

determining first and second sets of parameter and image characteristic values, wherein the first and second sets of parameter and image characteristic values comprise at least two pairs of elements, an element of a pair corresponding to a parameter value, the other element of the pair corresponding to an image characteristic value;

calculating a distance between pairs of the first set of parameter and image characteristic values and pairs of the second set of parameter and image characteristic values, wherein the obtained second set of image characteristic values comprises values equivalent to values of the determined first set of image characteristic values based on the distance calculated; and if there are equivalent values, setting the parameter value of the first video source device using the second set of image characteristic values.

2. The method according to claim 1, wherein the second set of image characteristic values is obtained by setting a parameter of the second set of parameter values with different values.

3. The method according to claim 1, wherein the element of the pair corresponding to values of different parameters, the other element of the pair corresponding to values of different image characteristics.

4. The method according to claim 1, wherein the number of pairs of the first set of parameter and image characteristic values is inferior to the number of pairs of the second set of parameter and image characteristic values.

5. The method according to claim 1, wherein setting the parameter value of the first video source device further comprises using a model of the second video source, said model defining image characteristic values as a function of parameter values.

6. The method according to claim 5, wherein the model uses at least one characteristic impacting image quality among gain, noise, exposure, contrast, shutter, motion blur, encoding and bandwidth.

7. The method according to claim 1, wherein determining equivalent values if the calculated distance is below a predetermined threshold.

8. The method according to claim 1, wherein if the determining of equivalent values gives a result with a confidence below a predetermined threshold, the first set of image characteristic values is adjusted to correspond with other image characteristic values generated from an image captured by the first video source device, before executing the determining of equivalent values again.

9. The method according to claim 1, wherein the method further comprises, for an image characteristic which is not scene-dependent, searching, in a database, a video source device having a type equivalent to the type of the first video source device; and if such a video source device is found, using its information for setting the first video source device parameter value in relation with the image characteristic which is not scene-dependent.

10. The method according to claim 1, wherein values are equivalent if the first set of parameter values, image characteristic values or parameter and image characteristic values is a subset of the second set of parameters values, image characteristic values or parameter and image characteristic values, respectively.

11. The method according to claim 1, wherein determining equivalent values comprises:
   determining a first parameter shift between first and second pairs of the first set of parameter and image characteristic values;
   determining a second parameter shift between third and fourth pairs of the second set of parameter and image characteristic values;
   the characteristic values of the first and third pairs being equal; the characteristic values of the second and fourth pairs being equal; and, determining whether the first and second parameter shifts are equivalent or not.

12. A non-transitory computer-readable medium comprising computer readable instructions which, when run on a computer, causes the computer to carry out a method of setting a parameter value of a first video source device, the method comprising:
   determining a first set of image characteristic values from an image captured by the first video source device configured with a first set of parameter values;
   obtaining a second set of image characteristic values generated from an image captured by a second video source device different from the first video source device, the second video source device being configured with a second set of parameter values;
   determining if the obtained second set of image characteristic values comprises values equivalent to values of the determined first set of image characteristic values;
   determining first and second sets of parameter and image characteristic values, wherein the first and second sets of parameter and image characteristic values comprise at least two pairs of elements, an element of a pair corresponding to a parameter value, the other element of the pair corresponding to an image characteristic value;
   calculating a distance between pairs of the first set of parameter and image characteristic values and pairs of the second set of parameter and image characteristic values, wherein the obtained second set of image characteristic values comprises values equivalent to values of the determined first set of image characteristic values based on the distance calculated; and
   if there are equivalent values, setting the parameter value of the first video source device using the second set of image characteristic values.

13. A device comprising a processing unit configured to carry out each of the steps of a method of setting a parameter value of a first video source device, the method comprising:
   determining a first set of image characteristic values from an image captured by the first video source device configured with a first set of parameter values;
   obtaining a second set of image characteristic values generated from an image captured by a second video source device different from the first video source device, the second video source device being configured with a second set of parameter values;
   determining if the obtained second set of image characteristic values comprises values equivalent to values of the determined first set of image characteristic values;
   determining first and second sets of parameter and image characteristic values, wherein the first and second sets of parameter and image characteristic values comprise at least two pairs of elements, an element of a pair corresponding to a parameter value, the other element of the pair corresponding to an image characteristic value;
   calculating a distance between pairs of the first set of parameter and image characteristic values and pairs of the second set of parameter and image characteristic values, wherein the obtained second set of image characteristic values comprises values equivalent to values of the determined first set of image characteristic values based on the distance calculated; and
   if there are equivalent values, setting the parameter value of the first video source device using the second set of image characteristic values.

* * * * *